United States Patent [19]

Keskin et al.

[11] Patent Number: 5,592,408

[45] Date of Patent: Jan. 7, 1997

[54] IDENTIFICATION CARD AND ACCESS CONTROL DEVICE

[75] Inventors: Yucel K. Keskin, Cupertino; Asil T. Gokcebay, San Francisco, both of Calif.

[73] Assignee: Security People, Inc., San Francisco, Calif.

[21] Appl. No.: 177,118

[22] Filed: Jan. 3, 1994

[51] Int. Cl.⁶ .................................................. G11C 13/00
[52] U.S. Cl. .................................................. 365/52; 365/63
[58] Field of Search .................................. 365/52, 51, 63, 365/94, 97

[56] References Cited

U.S. PATENT DOCUMENTS 3,774,179  11/1973  Wiegand et al. .
3,774,180  11/1973  Wiegand et al. .
3,820,090   6/1974  Wiegand .

FOREIGN PATENT DOCUMENTS

3615207  11/1987  Germany .

*Primary Examiner*—Terrell W. Fears
*Attorney, Agent, or Firm*—Thomas M. Freiburger

[57] ABSTRACT

An electronic identification device includes a header piece with stored memory and terminals for interfacing with an electronic port of a reader device, with encoded data programmed into the memory. An identification card, identifying the holder, is attached to the electronic header piece and bears printed information relating to and identifying the intended holder.

21 Claims, 7 Drawing Sheets

IDENTIFICATION CARD AND ACCESS CONTROL DEVICE

BACKGROUND OF THE INVENTION

This invention relates to an A which is used for adding electronic memory and intelligence to ordinary identification (ID) cards.

ID cards are widely known and used today. They come in several different standard sizes. Some are made of paper and some are made of plastic material or a combination of plastic and paper. Some cards come in several layers where there is a space to insert a picture, ready to be laminated. These cards are often attached to clothing for display.

Using ID cards as an apparatus for access control is also in use today. These cards contain some means of coding that is recognizable by the access rendering device, such as bar coding, magnetic stripe, placement of metal wafers (Wiegend U.S. Pat. Nos. 3,774,180 and 3,820,090), or proximity technology. A common feature of these cards is that the coding is attached or embedded into the card and cannot be altered unless the coding is removed and replaced and, since most of these cards are sealed, they cannot be reused. One shortcoming of these cards is that the coded information is limited to an ID number or similar coding of identification and they typically cannot handle extensive amounts of data, such as digitized fingerprint, retina scan, memorized PIN number, other authentication data, or some combination of said data. Therefore, usage of greater data capacity would be desirable in these systems.

There are other cards in use today which are identified as "smart cards". They carry read and write non-volatile memory where they can interact with the system in which they are being used. This may be an access control system, such as one taught by Haag et al., 3615207 Federal Republic of Germany, or a credit/debit system card. With this technology, the data capacity is increased tremendously and the cards are reusable by different personnel as the data they carry (including user-specific authentication) can be changed or rewritten. These smart cards usually come in a card shade and are a bit thicker than the ordinary credit card. They have terminal connections for reading and writing data. The placement of the terminals is usually brand-specific and they can be used in a variety of systems that incorporate this brand of cards. Therefore, the same card can fit into an access system as well as hospital patient records/medical history system or debit/credit system.

Combining the ID card containing employee/holder picture with the smart card would be very desirable in access control systems. Limiting the acceptance of the cards to the system of their intended usage would also be desirable. The current invention addresses these issues by a smart card conversion apparatus, that is, by combining an access control, memory-containing device with a conventional ID card, to produce a convenient, wearable credential with multiple functions.

Currently, in many applications, picture ID cards and smart cards are carried separately by a holder, such as an employee. This is because combining them has never suggested itself due to problems of their physical characteristics. The first problem is the size of the ID card versus the size of the smart card: unless they are exactly the same size, this attachment would be very difficult. There are about eight different standard sizes for ID cards, such as IBM type, credit card size, driver's license size, government size, etc.

Another problem would be that, upon attachment, the ID card could block the terminals of the smart card. In addition, if they were attached, the ID card would increase the thickness of the smart card and would not fit into the receiving device, unless the receiving device were altered for acceptance of the thicker material. Another problem would arise from insertion of the ID card along with the smart card into an acceptance receptacle or reading device, which would wear out the plastic coating of the ID card and require frequent replacement. Another problem is that, due to the heat sensitivity of the smart card, the two cards cannot be laminated, and, if they were laminated, it would defeat the purpose of reusability of the smart card portion of the combination. And finally, with standardization, no limitation could be applied to the acceptance of the card by other systems. Any card having the same shape and/or terminal connection points can be inserted for use, whether intended or not, which could reduce security.

SUMMARY OF THE INVENTION

The object of the present invention is to eliminate the problems experienced by the existing systems, by providing a conversion apparatus for converting ID cards into smart ID cards, and for providing a convenient combined ID and access control credential which efficiently serves multiple purposes.

In the preferred embodiment, the apparatus consists of a header piece which contains a read-write non-volatile memory device capable of recording data. The memory device may preferably be one manufactured by Dallas Semiconductor model series 1900, which is a self contained device with its battery packaged into a small metal can providing a single-wire-bus protocol for accessing the memory, commonly known as "touch memory" devices. The apparatus also contains a slot for insertion of an ID card and holes for securing the ID card to the apparatus with the use of snap-on pin. For fastening any type of a mechanical fastener including screws (with the hole 13 being threaded) and rivets can be used. The length of the apparatus differs based on the size of the card and whether the card in question is being used vertically or horizontally. The data recorded can be access identification, user/holder identification, user/holder authentication, patient history, or credit/debit data, for example.

The apparatus also has a hole suitable for clip-belt attachment. The memory device is accessible from the terminals located at an edge of the header piece which, when inserted into the reading device, provides electrical contact connection between the reader and the memory device. The memory device is also programmed through these terminals.

The edge where the terminals are connected contains a particular physical shape (keyway) which controls or limits the insertion of the apparatus to a specific type or category of reader. This particular physical shape (keyway) can be different for different systems and, in some cases, some apparatus may have a master level capability allowing entry into several different systems. In addition, the physical shape of the edge of the apparatus includes rounded corners for easy insertion into the reading receptacle.

DESCRIPTION OF PREFERRED EMBODIMENTS

Figure 1:
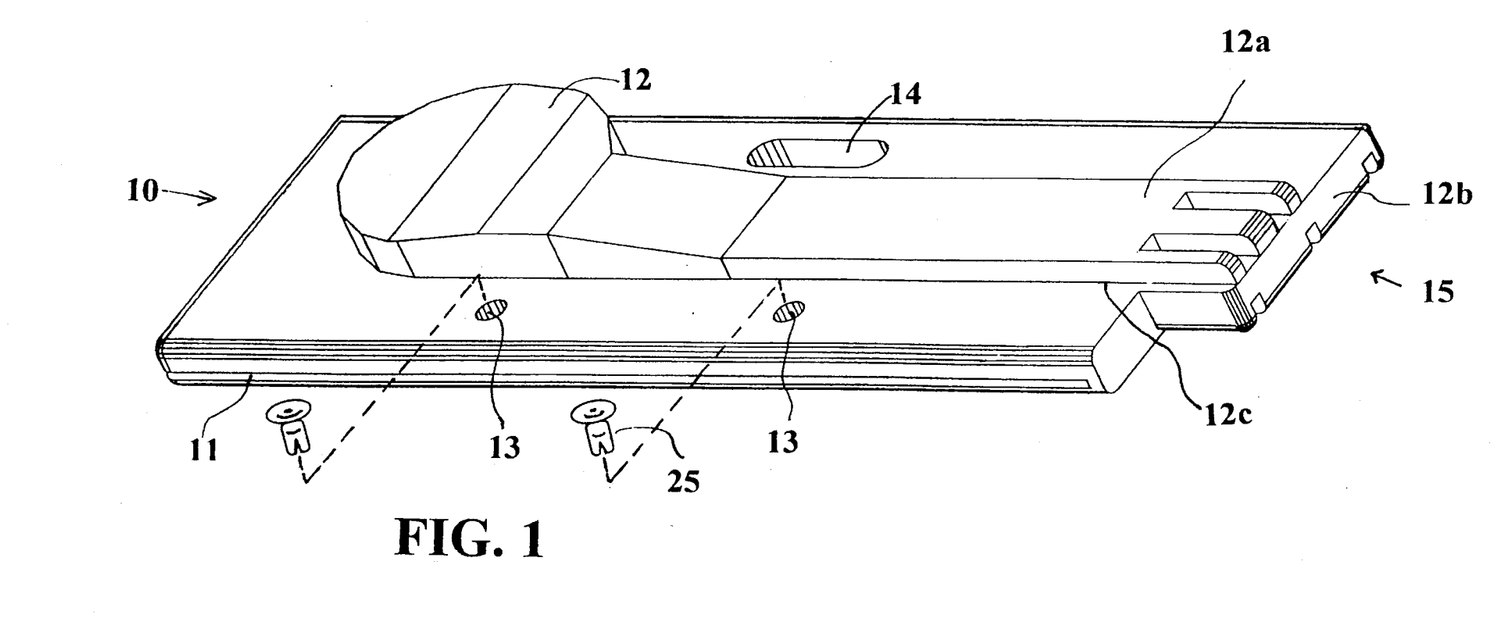
FIG 1 is a perspective view showing a top or outer surface and the edge containing particular physical shape (keyway) which controls or limits the insertion of a header piece of the invention.
Figure 1A:
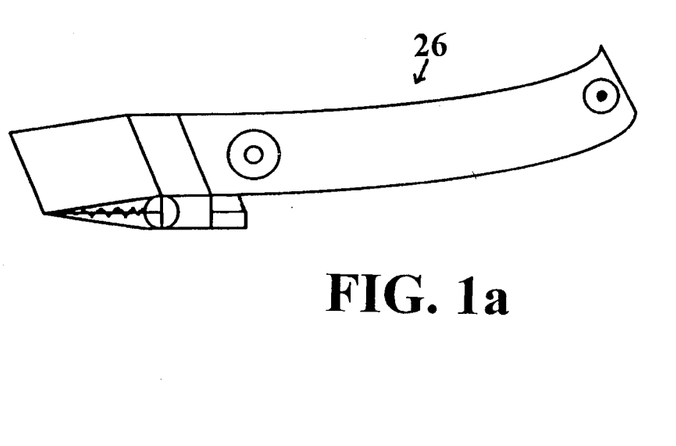
FIG 1a is a perspective view showing the clip-belt attachment for the header piece of the invention.
Figure 2:
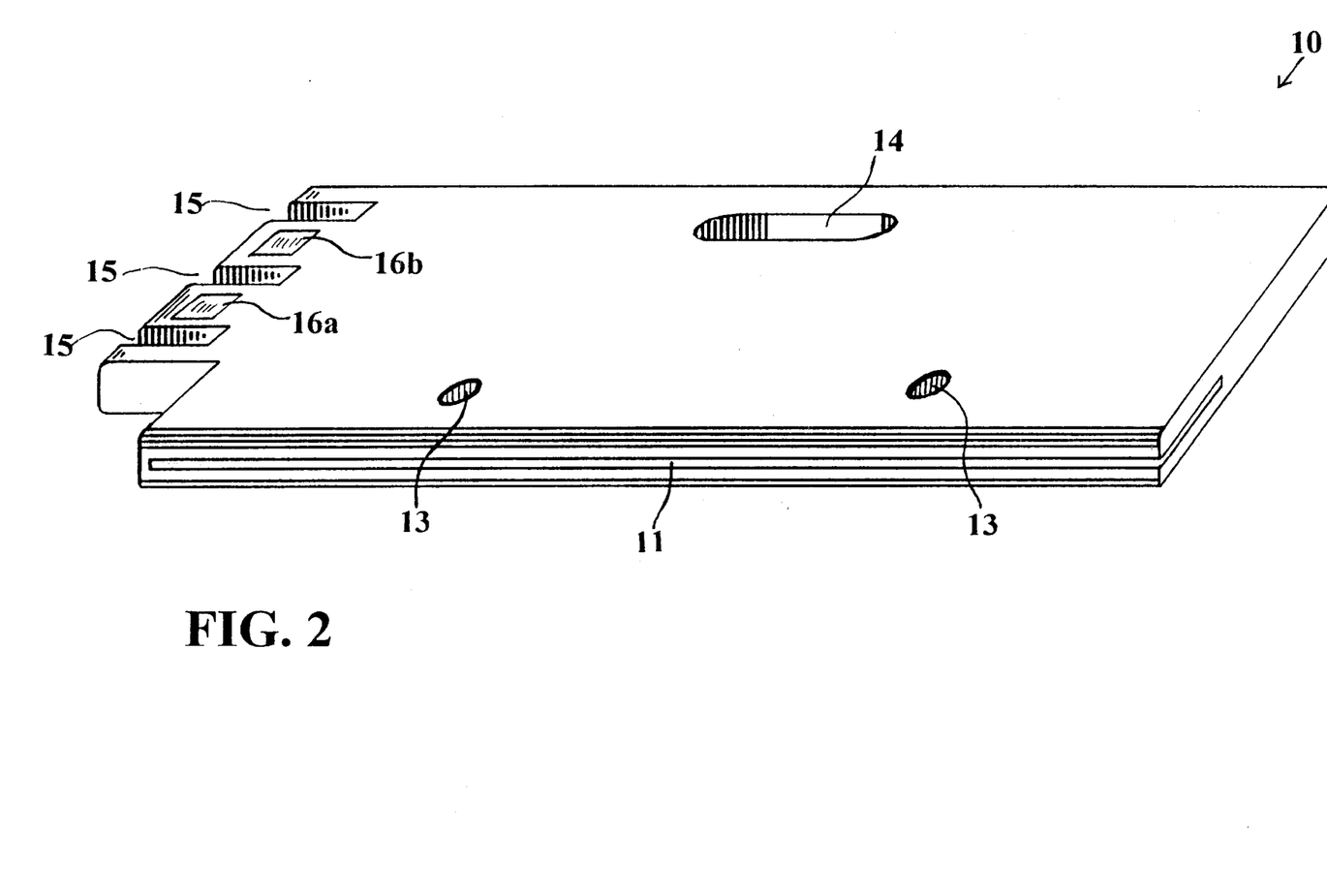
FIG 2 is a perspective view showing the outer bottom surface of the header piece, containing the contact terminals of the header piece of the invention.

In the drawings, FIG. 1 is a top view of a conversion apparatus or header piece 10, which contains a housing 12 for the memory chip, i.e. an outer cover or jacket 12 which is the exterior component of the header piece. This cover 12 can comprise two sections 12a and 12b joined together (e.g. at seam 12c) so as to envelop the interior device shown in FIG. 3 and described below. The two sections can be joined permanently by glue, solvent welding, or ultrasound bonding, for example. It is also possible to mold or cast this exterior component as one piece. Plastics that can be used for the outer jacket sections include fiberglass reinforced plastic, PVC, polyurethane, ABS, polypropylene and other plastics; preferably high-density polyethylene is used. The apparatus is attached to clothing by a belt clip 26 shown in FIG 1a through hole 14 and the ID card is attached to the apparatus by sliding the card into the apparatus through a slot 11 and securing it with snap-on pins or set screws or other mechanical securing apparatus 25 through the holes 13. The apparatus also contains a slot configuration 15 which can differ from apparatus to apparatus to create a system-specific keyway. These slot configurations comprise parallel slots with specific spacing such as the five slots (three on one side, two on the other shown in the figures). This eliminates the insertion of unintended devices into the reading receptacle. In FIG. 2, the connection terminals 16a and 16b for the memory chip are shown. When inserted into the reading receptacle, the connection terminals 16a and 16b make contact with the terminals inside the reading receptacle and provide communication between the reading receptacle and the memory device.

Figure 3:
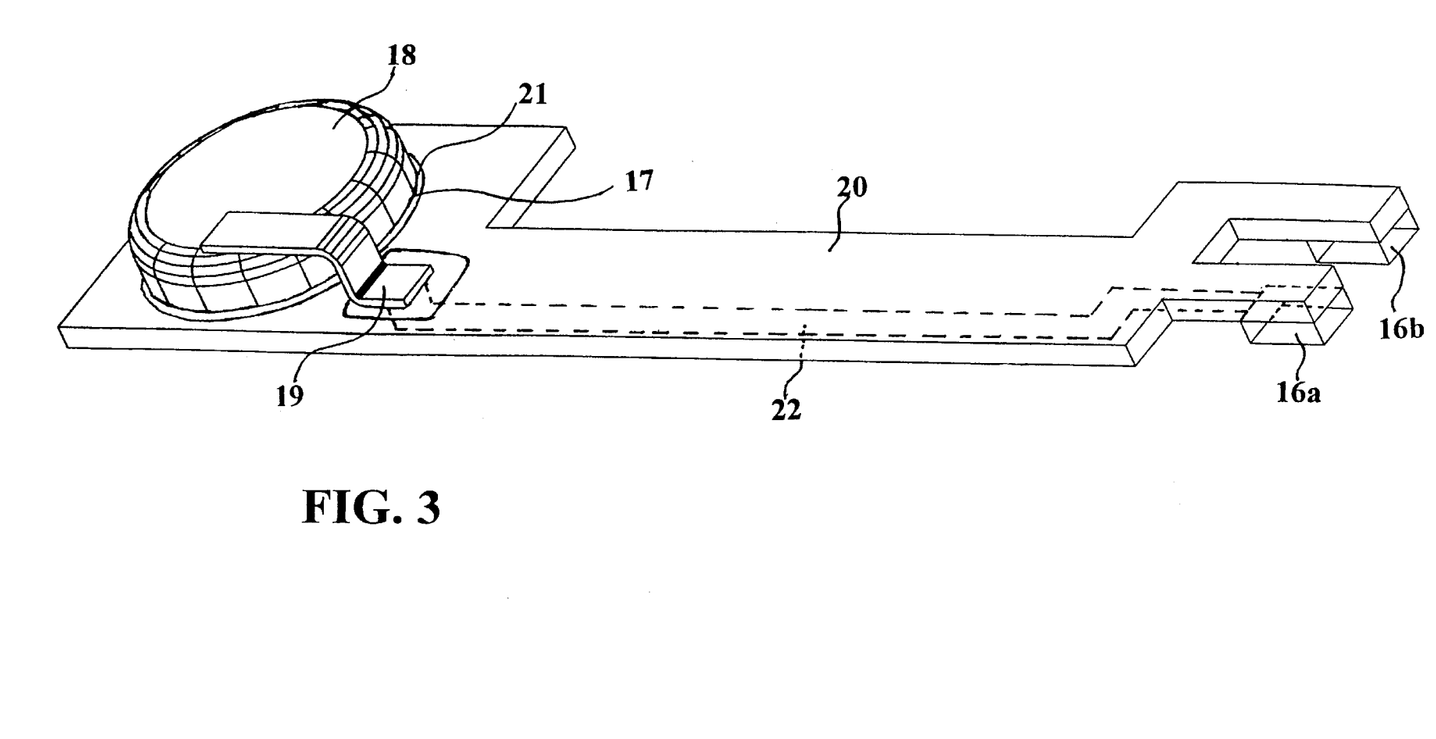
FIG 3 is a perspective view showing a memory device and its placement circuit on a circuit board which is contained within the header piece of FIGS. 1–2 shown with the header cover removed.
Figure 4:
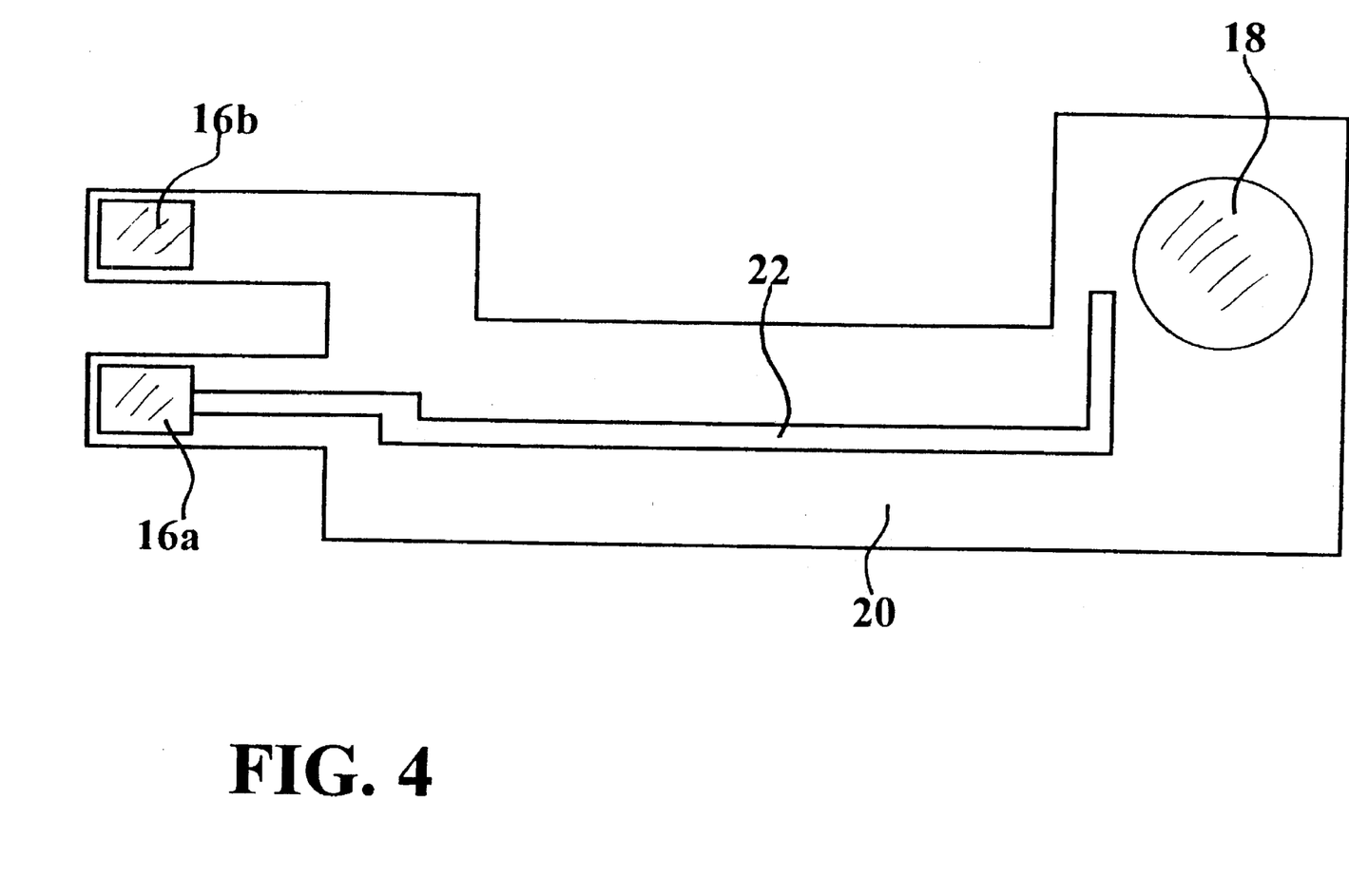
FIG. 4 shows a back side of the memory device and its circuit seen in FIG. 3.

FIG. 3 shows an inner portion of the apparatus. The memory device 18 is attached to the circuit board 20 through the hole 17 and secured by the pressure ring 21. By applying pressure, the pressure ring 21 secures the connection between the conductive circuit board 20 and the body of the memory device 18. This is the ground part of the connection from the memory device 18 which is carried to the terminal 16b. The data part of the connection from the memory device 18 to the terminal 16a is provided by a small probe 19 which lands on an isolated part of the board 20 and the connection is provided by an isolated strip 22 on the circuit board 20. This connection is better seen in FIG. 4.

Figure 5:
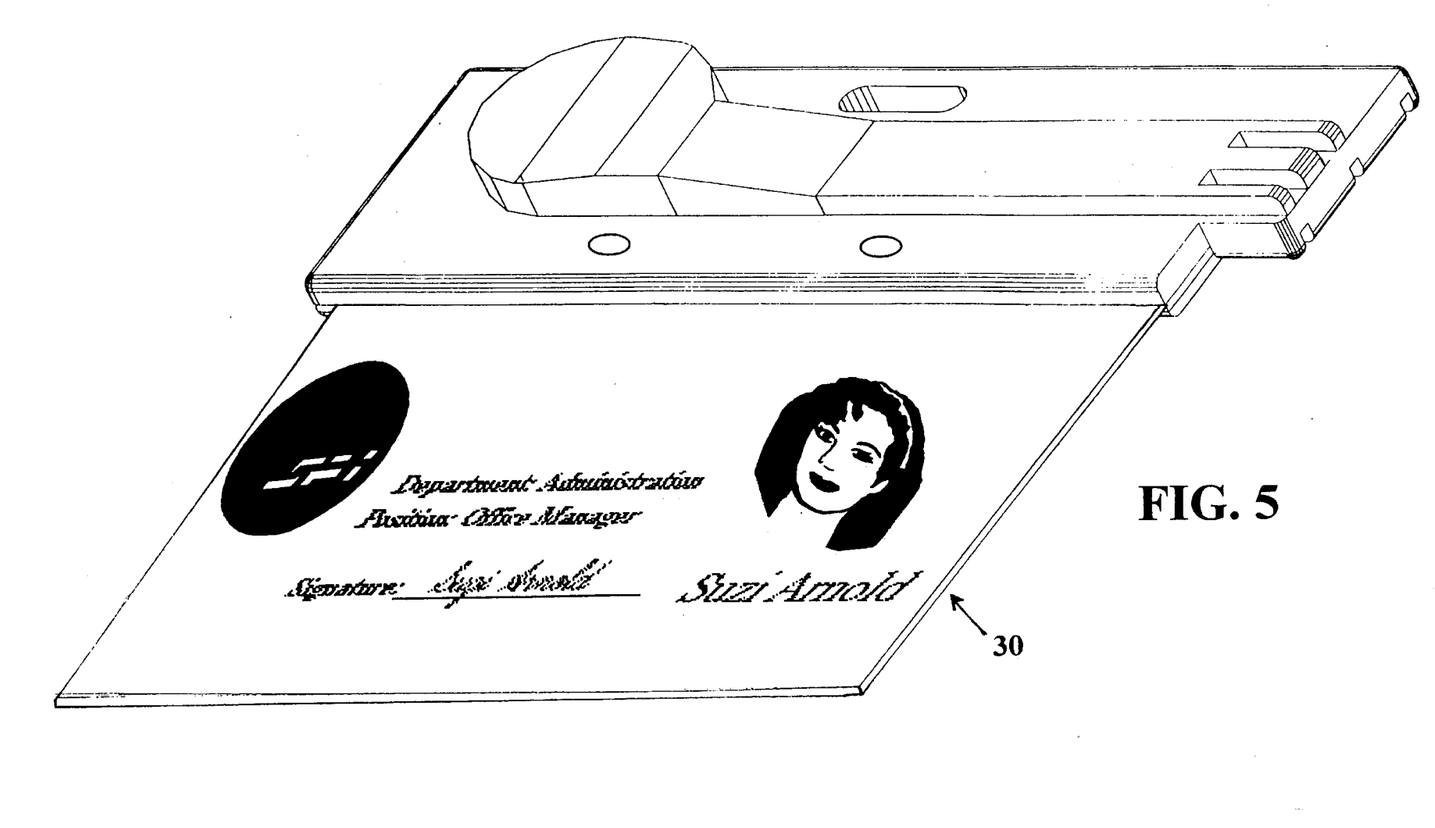
FIG. 5 is a front view of the apparatus attached to a horizontal ID card.

FIG. 5 shows the apparatus attached to a horizontal ID card 30.

Figure 6:
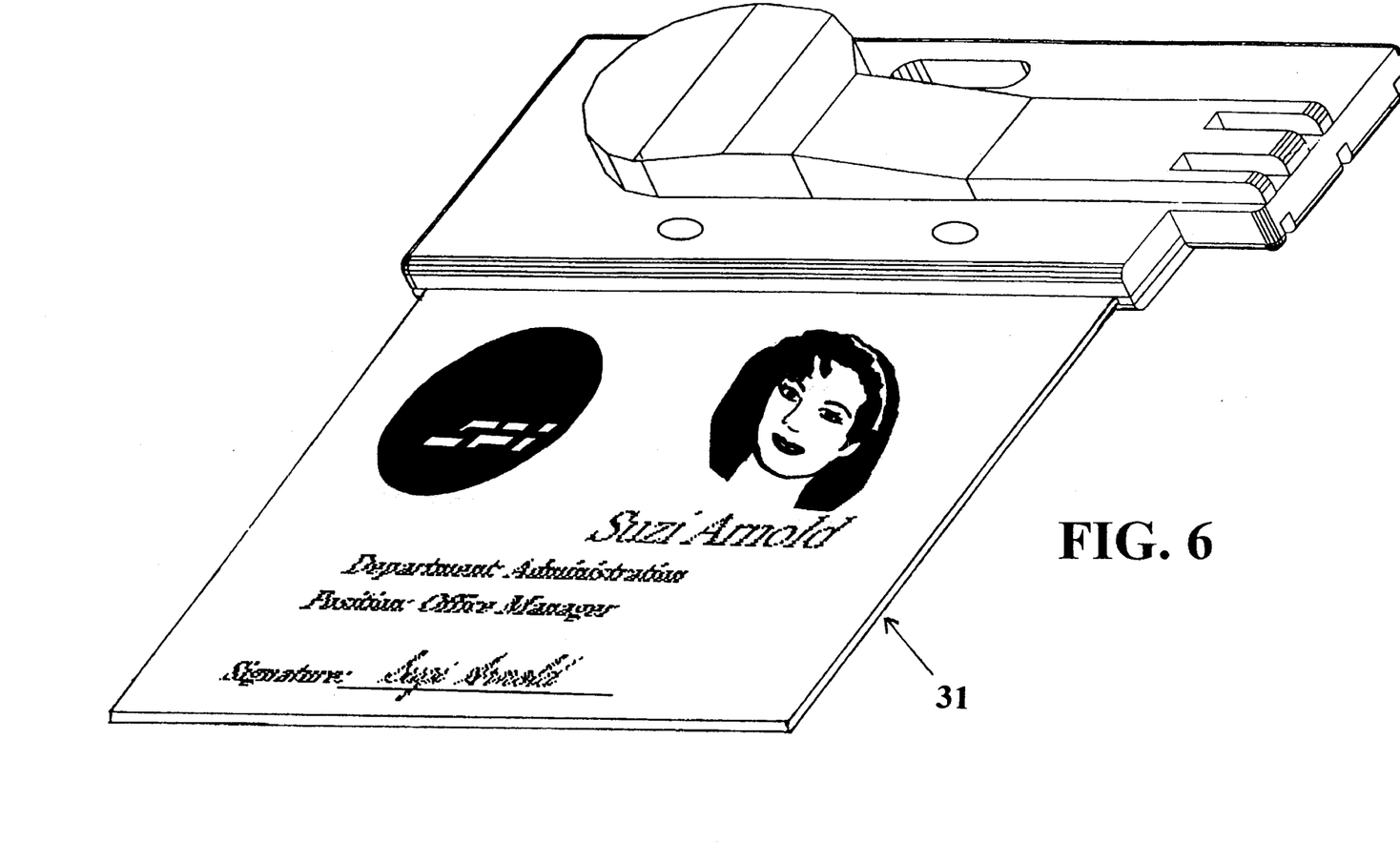
FIG 6 is a front view of the apparatus attached to a vertical ID card.

FIG. 6 shows the apparatus attached to a vertical ID card 31.

Figure 7:
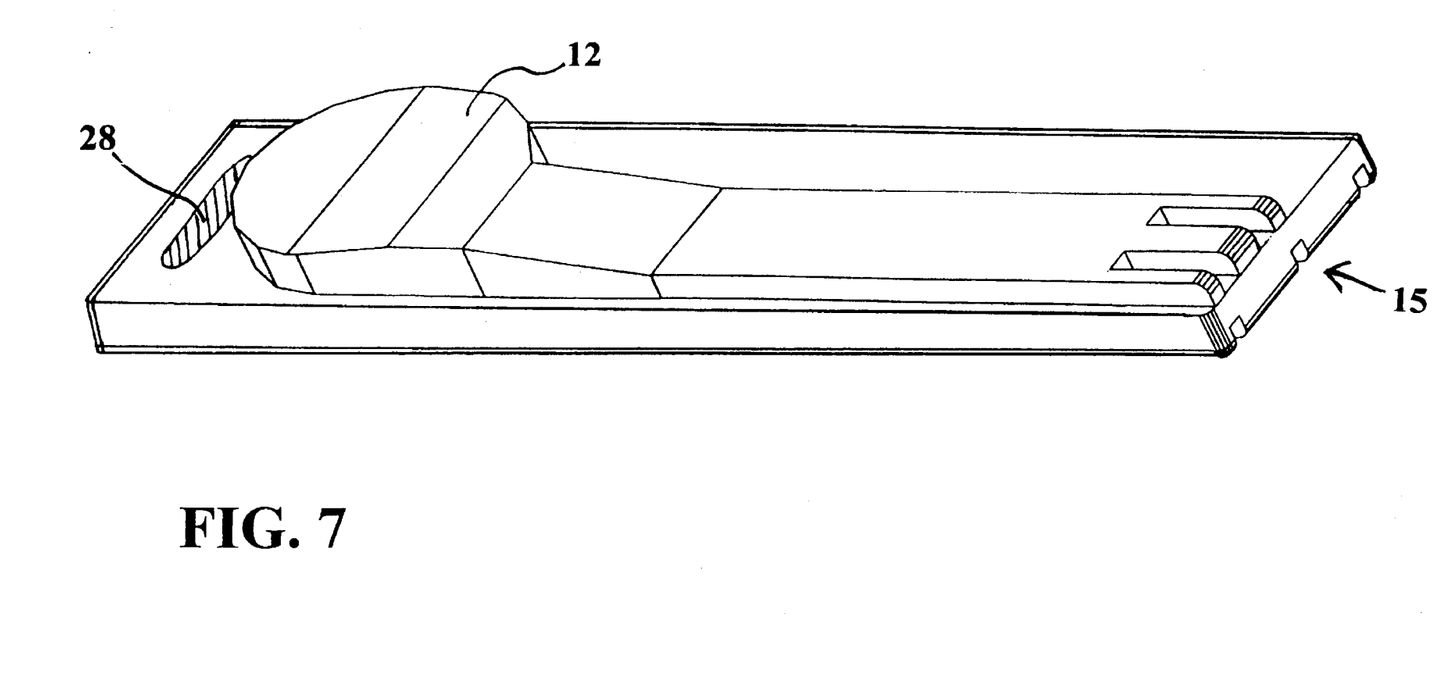
FIG. 7 shows the same apparatus being used as key chain unit without having means for holding an ID card.

FIG. 7 shows the same apparatus without the slot 14 for attachment to clothing, and slot 11 and holes 13 for card attachment. Instead, it contains a slot 28 for attachment to a key ring. With this version of the apparatus, systems can be expanded to include access devices that do not include the picture ID card but utilize and use the same data/protocol structure and same reading receptacles.

The above described preferred embodiments are intended to illustrate the principles of the invention but without limiting its scope. Other embodiments and variations to these preferred embodiments will be apparent to those skilled in the art and may be made without departing from the essence and scope of the invention as defined in the claims.

We claim:

1. An electronic identification device, comprising:

an electronic header piece as a first component, the header piece including a housing containing a memory means with stored electronic memory and connection terminals for interfacing with an electronic port of a reader device, encoded data programmed into the memory of the electronic header, and an identification card as a second component non-integral with said first component, the card including information relating to a and identifying an intended holder of the device, and attachment means for securing the identification card to the header piece via an edge of the indentification card.

2. The apparatus of claim 1, wherein the encoded data includes an access code means for enabling a holder entry into a controlled area.

3. The device of claim 2, wherein the encoded data further includes user authentication data.

4. The device of claim 3, wherein the user authentication data includes data relating to personal identifying features of an authorized user.

5. The device of claim 1, wherein the identification card includes data which relates uniquely to a user.

6. The device of claim 1, wherein the identification card is rigidly attached to the header piece.

7. The device of claim 6, wherein the header piece includes an elongated slot of a size which closely receives the identification card, the card being secured within a slot in the header.

8. The device of claim 7, wherein the card is secured within the slot by mechanical fasteners passing through holes in the header piece and in the card, transverse to the slot.

9. The device of claim 8, wherein the mechanical fasteners comprise snap pins, set screws or rivets.

10. The device of claim 1, further including means preventing insertion of the device into unauthorized control ports.

11. The device of claim 10, further including round edges on the header piece for easy insertion of the device into the reading receptacle or control port.

12. The device of claim 10, wherein the means for preventing insertion into unauthorized control ports comprises an end of the header piece having the connection terminals located thereon and the end being distinctively shaped to conform to the shape of an authorized preselected control port.

13. The device of claim 1, wherein the encoded data includes data relating uniquely to the user identified on the identification card.

14. The device of claim 1, wherein the memory means of the header piece comprises an externally programmable non-volatile memory device.

15. In combination, an electronic access control device and an identification card for identifying the intended user of the access control device, comprising:

a header piece including an outer housing of plastic material, the header piece containing non-volatile memory means for containing information relating to the identity of an intended holder of the device, and the header piece including exposed electrical contacts positioned for connection in a port of a memory reader device, the memory reader device being programmed to permit or deny access depending on the information read from non-volatile memory means, card connection means on the header piece for receiving an identification card and securing the card to the header piece, and an identification card containing information identifying the intended holder of the device, secured to the header piece via the securing means.

16. The apparatus of claim 1, wherein the securing means of the header piece comprises an elongated slot sized to closely fit over an edge of the identification card.

17. The apparatus of claim 16, wherein the securing means further includes at least one hole through the header piece, extending transversely through the slot, and a mechanical fastener passing through the hole and the card in the slot and securing the card in place in the slot.

18. The apparatus of claim 15, wherein the non-volatile memory means comprises an EEPROM with a battery in the header piece powering the EEPROM.

19. The apparatus of claim 15, wherein the non-volatile memory means contains stored information including an encoded biometric feature of the intended holder of the device.

20. The apparatus of claim 15, wherein the non-volatile memory means contains stored information including a personal identification number (PIN) to be memorized by the intended holder of the device.

21. The apparatus of claim 15, wherein the non-volatile memory means contains stored information including the name and other personal credentials such as department, job title and years of employment of the intended holder of the device.

\* \* \* \* \*